US012397461B2

(12) United States Patent
Torii et al.

(10) Patent No.: US 12,397,461 B2
(45) Date of Patent: Aug. 26, 2025

(54) CUTTING DEVICE AND NON-TRANSITORY COMPUTER READABLE STORAGE MEDIUM

(71) Applicant: BROTHER KOGYO KABUSHIKI KAISHA, Nagoya (JP)

(72) Inventors: Kentaro Torii, Nagoya (JP); Kentaro Sugiyama, Gifu (JP); Takeshi Asano, Hashima (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 546 days.

(21) Appl. No.: 17/828,531

(22) Filed: May 31, 2022

(65) Prior Publication Data

US 2022/0379512 A1 Dec. 1, 2022

(30) Foreign Application Priority Data

May 31, 2021 (JP) ................................ 2021-091637

(51) Int. Cl.
*B26D 5/06* (2006.01)
*B26D 5/00* (2006.01)

(52) U.S. Cl.
CPC ............... *B26D 5/06* (2013.01); *B26D 5/005* (2013.01)

(58) Field of Classification Search
CPC ................................. B26D 5/005; B26D 5/06
See application file for complete search history.

(56) References Cited

U.S. PATENT DOCUMENTS 5,353,355 A * 10/1994 Takagi .................. B26D 5/005 700/135
2012/0247293 A1* 10/2012 Nagai .................. B26F 1/3806 83/76.3
2014/0352511 A1* 12/2014 Yamanashi .......... G05B 19/409 700/114
2015/0053054 A1* 2/2015 Hollo .................... B26F 1/3813 83/13
2017/0197324 A1* 7/2017 Bain ...................... G06T 11/20
2018/0111282 A1* 4/2018 Yamanashi ........... B26D 5/005
2019/0143550 A1* 5/2019 Stolzer .................. B23D 53/00 83/39
2020/0246926 A1* 8/2020 Rempfler ................ B26D 5/00
2020/0290230 A1* 9/2020 Mizutani ................ B41J 11/703
2021/0001502 A1* 1/2021 Gistas Perez ............ B26D 5/00
2023/0065812 A1* 3/2023 Mauermann ........... B23Q 15/18

FOREIGN PATENT DOCUMENTS

JP H07148694 A 6/1995
JP H08252796 A 10/1996
JP 2017064843 A 4/2017

* cited by examiner

*Primary Examiner* — Omar Flores Sanchez
(74) *Attorney, Agent, or Firm* — K&L Gates LLP

(57) ABSTRACT

A cutting device controls a movement mechanism based on cutting data for cutting, along a cutting line, an object to be cut placed on a placement member. The cutting device acquires an attribute of the cutting line. The cutting device decides, based on the acquired attribute, a correction amount to correct the cutting line. The cutting device generates, based on the cutting data, corrected cutting data for cutting the object to be cut along the cutting line corrected by the decided correction amount. The cutting device controls the movement mechanism based on the generated corrected cutting data and cutting the object to be cut.

8 Claims, 15 Drawing Sheets

CUTTING DATA D1(CUTTING PATTERN M1)

| No | COORDINATE DATA |
|---|---|
| 1 | P11(X(11), Y(11)) |
| 2 | P12(X(12), Y(12)) |
| 3 | P13(X(13), Y(13)) |
| : | : |

| No | CUTTING LINE DATA | |
|---|---|---|
| | CUTTING LINE | ATTRIBUTE |
| 1 | L11(P11-P12) | FIRST |
| 2 | L12(P12-P13) | FIRST |
| : | : | : |

CUTTING DATA D3(CUTTING PATTERN M3)

| No | COORDINATE DATA |
|---|---|
| 1 | P31(X(31), Y(31)) |
| 2 | P32(X(32), Y(32)) |
| 3 | P33(X(33), Y(33)) |
| 4 | P34(X(34), Y(34)) |
| : | : |

| No | CUTTING LINE DATA | | | |
|---|---|---|---|---|
| | CUTTING LINE | ATTRIBUTE | CURVATURE | LENGTH |
| 1 | L31(P31-P32) | SECOND | r31 | s31 |
| 2 | L32(P32-P33) | SECOND | r32 | s32 |
| 3 | L33(P33-P34) | SECOND | r33 | s33 |
| : | : | : | : | : |

FIG. 7

T

| ATTRIBUTE | ANGLE | CURVATURE | CONSECUTIVE | LENGTH | SURPLUS CUTTING LENGTH | |
|---|---|---|---|---|---|---|
| FIRST | LESS THAN Th1 | – | – | – | B(1) | t11 |
| | EQUAL TO OR GREATER THAN Th1 | – | – | – | B(2) | t12 |
| SECOND | LESS THAN Th2 | – | – | – | C(1) | t21 |
| | EQUAL TO OR GREATER THAN Th2 | LESS THAN Th3 | – | – | C(2) | t22 |
| | | EQUAL TO OR GREATER THAN Th3 | LESS THAN Th4 | EQUAL TO OR GREATER THAN Th5 | C(3) | t23 |
| | | | | LESS THAN Th5 | C(4) | t24 |
| | | | EQUAL TO OR GREATER THAN Th4 | EQUAL TO OR GREATER THAN Th5 | C(5) | t25 |
| | | | | LESS THAN Th5 | C(6) | t26 |

CORRECTED CUTTING DATA Da1 (CUTTING PATTERN M1)

| No | COORDINATE DATA |
|---|---|
| 1 | P11 (X(11), Y(11)) |
| 2 | Pa12 (X(12a), Y(12a)) |
| 3 | P12 (X(12), Y(12)) |
| 4 | Pa13 (X(13a), Y(13a)) |
| : | : |

| No | CUTTING LINE DATA | |
|---|---|---|
| | CUTTING LINE | ATTRIBUTE |
| 1 | La11 (P11-Pa12) | FIRST |
| 2 | La12 (P12-Pa13) | FIRST |
| : | : | : |

CUTTING DATA D2(CUTTING PATTERN M2)

| No | COORDINATE DATA |
|---|---|
| 1 | P21(X(21), Y(21)) |
| 2 | P22(X(22), Y(22)) |
| 3 | P23(X(23), Y(23)) |
| : | : |

| No | CUTTING LINE DATA | |
|---|---|---|
| | CUTTING LINE | ATTRIBUTE |
| 1 | L21(P21-P22) | FIRST |
| 2 | L22(P22-P23) | FIRST |
| : | : | : |

CORRECTED CUTTING DATA Da2(CUTTING PATTERN M2)

| No | COORDINATE DATA |
|---|---|
| 1 | Pa21(X(21a), Y(21a)) |
| 2 | Pa22(X(22a), Y(22a)) |
| 3 | Pa23(X(23a), Y(23a)) |
| : | : |

| No | CUTTING LINE DATA | |
|---|---|---|
| | CUTTING LINE | ATTRIBUTE |
| 1 | La21(Pa21-Pa22) | FIRST |
| 2 | La22(Pa22-Pa23) | FIRST |
| : | : | : |

CUTTING DATA Da3(CUTTING PATTERN M3)

| No | COORDINATE DATA |
|---|---|
| 1 | P31(X(31),Y(31)) |
| 2 | Pa32(X(32a),Y(32a)) |
| 3 | P32(X(32),Y(32)) |
| 4 | Pa33(X(33a),Y(33a)) |
| 5 | P33(X(33),Y(33)) |
| 6 | Pa34(X(34a),Y(34a)) |
| : | : |

| No | CUTTING LINE DATA | | | |
|---|---|---|---|---|
| | CUTTING LINE | ATTRIBUTE | CURVATURE | LENGTH |
| 1 | La31(P31-Pa32) | SECOND | r31 | s31 |
| 2 | La32(P32-Pa33) | SECOND | r32 | s32 |
| 3 | La33(P33-Pa34) | SECOND | r33 | s33 |
| : | : | : | : | : |

CUTTING DATA D4 (CUTTING PATTERN M4)

| No | COORDINATE DATA |
|---|---|
| 1 | P41 (X (41), Y (41)) |
| 2 | P42 (X (42), Y (42)) |
| 3 | P43 (X (43), Y (43)) |
| 4 | P44 (X (44), Y (44)) |
| : | : |

| No | CUTTING LINE DATA | | | |
|---|---|---|---|---|
| | CUTTING LINE | ATTRIBUTE | CURVATURE | LENGTH |
| 1 | L41 (P41-P42) | SECOND | r41 | s41 |
| 2 | L42 (P42-P43) | SECOND | r42 | s42 |
| 3 | L43 (P43-P44) | SECOND | r43 | s43 |
| : | : | : | : | : |

CORRECTED CUTTING DATA Da4(CUTTING PATTERN M4)

| No | COORDINATE DATA |
|---|---|
| 1 | Pa41(X(41a),Y(41a)) |
| 2 | Pa42(X(42a),Y(42a)) |
| 3 | Pa43(X(43a),Y(43a)) |
| 4 | Pa44(X(44a),Y(44a)) |
| : | : |

| No | CUTTING LINE DATA | | | |
|---|---|---|---|---|
| | CUTTING LINE | ATTRIBUTE | CURVATURE | LENGTH |
| 1 | La41(Pa41-Pa42) | SECOND | r41 | s41 |
| 2 | La42(Pa42-Pa43) | SECOND | r42 | s42 |
| 3 | La43(Pa43-Pa44) | SECOND | r43 | s43 |
| : | : | : | : | : |

CUTTING DEVICE AND NON-TRANSITORY COMPUTER READABLE STORAGE MEDIUM

CROSS-REFERENCE TO RELATED APPLICATIONS

This application claims priority to Japanese Patent Application No. 2021-091637, filed May 31, 2021. The disclosure of the foregoing application is incorporated herein by reference in its entirety.

BACKGROUND

The present disclosure relates to a cutting device capable of cutting an object to be cut, and a non-transitory computer readable storage medium.

A cutting device is known that cuts a sheet-shaped object to be cut by moving the object to be cut and a cutting blade relative to each other. As an example of a technology for improving cutting accuracy in the cutting device, an overrun cut is known. The overrun cut is a cutting method that cuts a surplus by moving the cutting blade to a position exceeding an end point of a cutting line. For example, a cutting system is known that determines whether or not to perform the overrun cut, depending on an intersection angle of two cutting lines that are cut consecutively.

SUMMARY

In order to further improve the cutting accuracy, a cutting amount of the overrun cut is preferably corrected in accordance with an attribute of the cutting line. However, in the known system, the cutting amount of the overrun cut is set to be constant. Therefore, there is a problem in that the cutting amount cannot be corrected in accordance with the attribute of the cutting line.

The object of the present disclosure is to provide a cutting device capable of improving cutting accuracy by correcting a cutting line using a correction amount in accordance with an attribute, and a non-transitory computer readable medium.

Various embodiments herein provide a cutting device includes a mounter, a movement mechanism, a storage, a processor, and a memory. The mounter mounts a cutter thereto. The movement mechanism moves the mounter relative to a placement member that is configured to place an object to be cut. The storage stores cutting data for cutting, along a cutting line, the object to be cut placed on the placement member. The processor controls the movement mechanism based on the cutting data stored in the storage. The memory stores computer-readable instructions that, when executed by the processor, instruct the processor to perform processes. The processes include acquisition processing, decision processing, generation processing, and cutting processing. The acquisition processing acquires an attribute of the cutting line. The decision processing decides, based on the attribute acquired by the acquisition processing, a correction amount to correct the cutting line. The generation processing generates, based on the cutting data stored in the storage, corrected cutting data for cutting the object to be cut along the cutting line corrected by the correction amount decided by the decision processing. The cutting processing controls the movement mechanism based on the corrected cutting data generated by the generation processing and cutting the object to be cut.

Various embodiments also provide a non-transitory computer readable storage medium. The storage medium stores computer readable instructions that, when executed by a processor, cause the processor to perform processes. The processes include acquisition processing, decision processing, and generation processing. The acquisition processing acquires an attribute of a cutting line when cutting an object to be cut placed on a placement member. The decision processing decides, based on the attribute acquired by the acquisition processing, a correction amount to correct the cutting line. The generation processing generates, based on cutting data for cutting the object to be cut along the cutting line, corrected cutting data for controlling a movement mechanism for moving a mounter that mounts a cutter thereto relative to the placement member, for cutting the object to be cut along the cutting line corrected by the correction amount decided by the decision processing.

The cutting device corrects the cutting line after deciding the correction amount in accordance with the attribute of the cutting line and cuts the object to be cut. Thus, the cutting device can improve a cutting accuracy at the time of cutting.

BRIEF DESCRIPTION OF THE DRAWINGS

Embodiments of the disclosure will be described below in detail with reference to the accompanying drawings in which:

FIG. 7 is a diagram showing a table;

DETAILED DESCRIPTION

Figure 1:
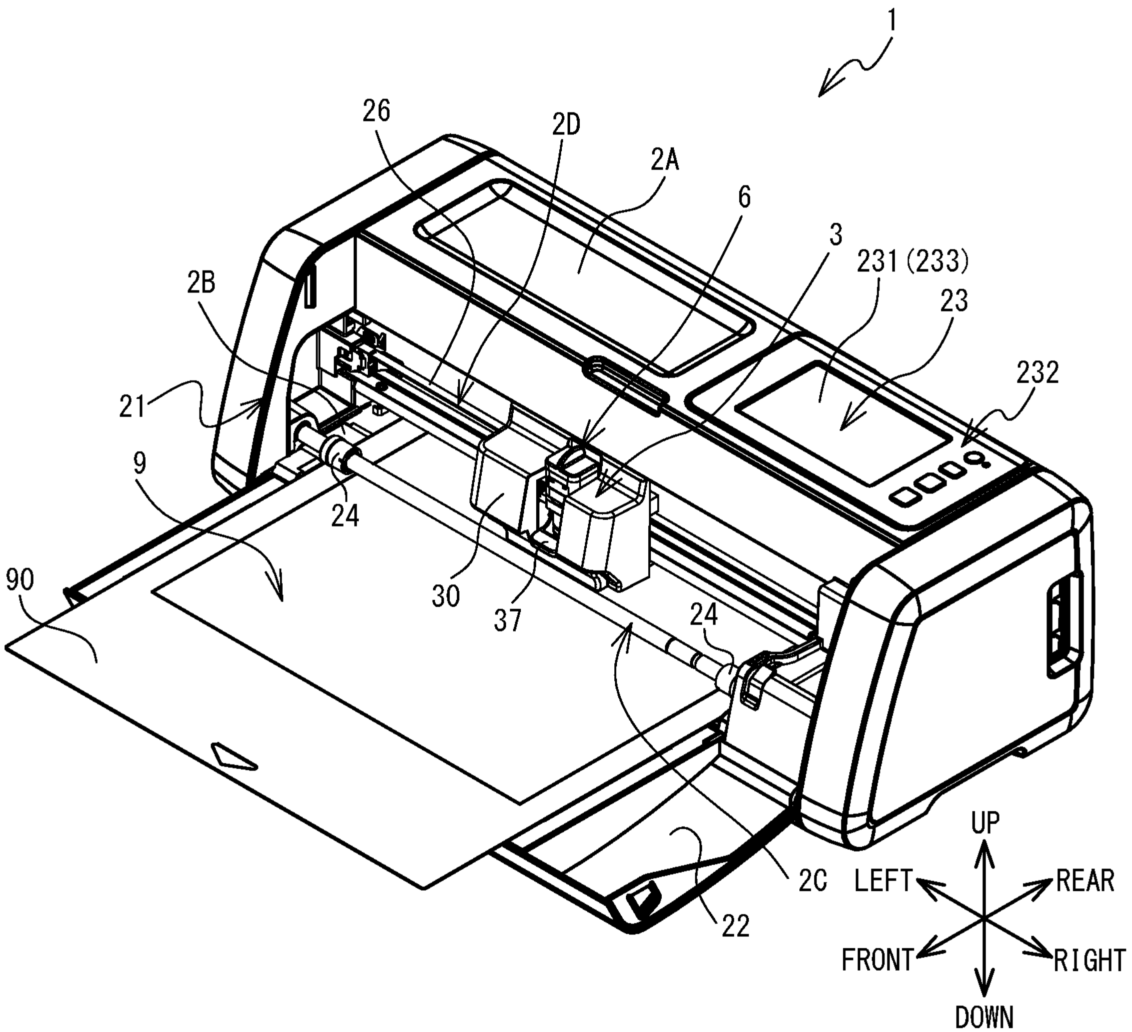
FIG. 1 is a perspective view of a cutting device.

An embodiment embodying a cutting device 1 according to the present disclosure will be described with reference to the accompanying drawings. The referenced drawings are drawings for illustrating technological features that can be employed by the present disclosure. Configurations and the like of devices described herein are not intended to be limited thereto and are merely illustrative examples. The lower left side, the upper right side, the lower right side, the upper left side, the upper side, and the lower side in FIG. 1 are, respectively, a front side, a rear side, a right side, a left side, an upper side, and a lower side of the cutting device 1 and a holder 6.

Overview of Cutting Device 1

An overview of the cutting device 1 will be described with reference to FIG. 1 to FIG. 3. The cutting device 1 can cut an object to be cut 9 held by a holding portion 90, using a cutting blade 72 held by the holder 6. The holding portion 90 is a mat formed from a synthetic resin material, for example. The object to be cut 9 is held by being adhered to an adhesive layer of the upper surface of the holding portion 90, in a state of being placed on the holding portion 90. The cutting device 1 is provided with a main body cover 2A, a platen 2B, a carriage 3, a conveyance mechanism 2C, a movement mechanism 2D, and the like.

An opening portion 21, a cover 22, and an operation portion 23 are provided at the main body cover 2A. The opening portion 21 is provided at a front surface portion of the main body cover 2A. The cover 22 is rotatably supported by the main body cover 2A. FIG. 1 shows a state in which the cover 22 is open and the opening portion 21 is opened up. Hereinafter, each of configurations will be described based on the assumption that the cover 22 is in the open state. The operation portion 23 is provided at a right portion on the upper surface of the main body cover 2A. The operation portion 23 is provided with a liquid crystal display (LCD) 231, a plurality of operating switches 232, and a touch panel 233. Images including various items, such as commands, illustrations, setting values, messages, and the like are displayed on the LCD 231. The touch panel 233 is provided on the front surface of the LCD 231. A user performs a pressing operation on the touch panel 233 using a finger or a stylus pen. The cutting device 1 recognizes which of the items has been selected, in correspondence with a pressed position detected by the touch panel 233. The user can use the operating switches 232 and the touch panel 233 to select a pattern displayed on the LCD 231, to set various parameters, to input an operation, and the like.

The platen 2B is provided inside the main body cover 2A. The platen 2B is a plate-shaped member extending in the left-right direction. The length in the left-right direction of the platen 2B is larger than the widths of the holding portion 90 and the object to be cut 9. The holding portion 90 that has been conveyed to the rear by the conveyance mechanism 2C is disposed on a portion of the upper surface, of the platen 2B, excluding portions at both end portions in the left and right directions. In other words, the object to be cut 9 held by the holding portion 90 is placed on the platen 2B via the holding portion 90.

The conveyance mechanism 2C and the movement mechanism 2D are configured to move the object to be cut 9 placed on the platen 2B and the mounter 3B relative to each other in the front-rear direction and the left-right direction. The conveyance mechanism 2C is provided with a driven roller 24, a drive roller (not shown in the drawings), and a Y-axis motor 57 (refer to FIG. 4). The driven roller 24 is rotatably supported inside the main body cover 2A, further to the front than the platen 2B. The drive roller faces the driven roller 24 from below, and rotates in accordance with driving of the Y-axis motor 57. The conveyance mechanism 2C clamps both the left and right end portions of the rectangular holding portion 90, which holds the object to be cut 9, between the driven roller 24 and the drive roller. The conveyance mechanism 2C can convey the holding portion 90 in the front-rear direction (also referred to as a "Y direction") by rotating the drive roller in this state. In other words, the conveyance mechanism 2C can convey the object to be cut 9 held by the holding portion 90 in the front-rear direction.

The movement mechanism 2D can move the carriage 3 in the left-right direction (also referred to as an "X direction"). The movement mechanism 2D is provided with a guide rail 26, an X-axis motor 58 (refer to FIG. 4), and the like. The guide rail 26 is fixed inside the main body cover 2A and extends in the left-right direction. The carriage 3 can move in the X direction along the guide rail 26, and is supported by the guide rail 26. Rotational movement of the X-axis motor 58 is converted to a movement in the X direction, and is transmitted to the carriage 3. When the X-axis motor 58 is driven in a forward direction or is driven in a reverse direction, the carriage 3 moves in the leftward direction or the rightward direction.

Figure 2:
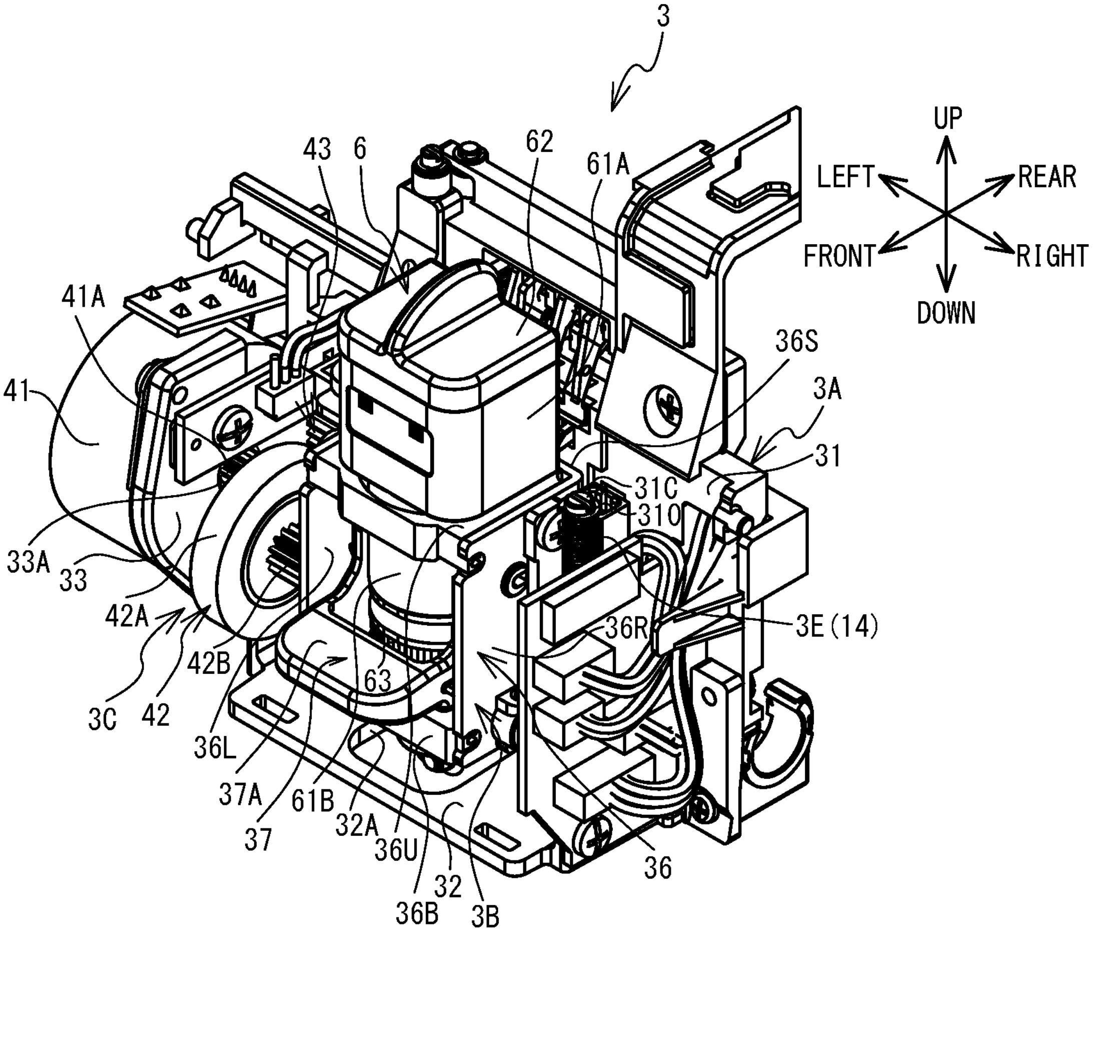
FIG. 2 is a perspective view of a carriage in a state in which a holder is mounted to a mounter.
Figure 3:
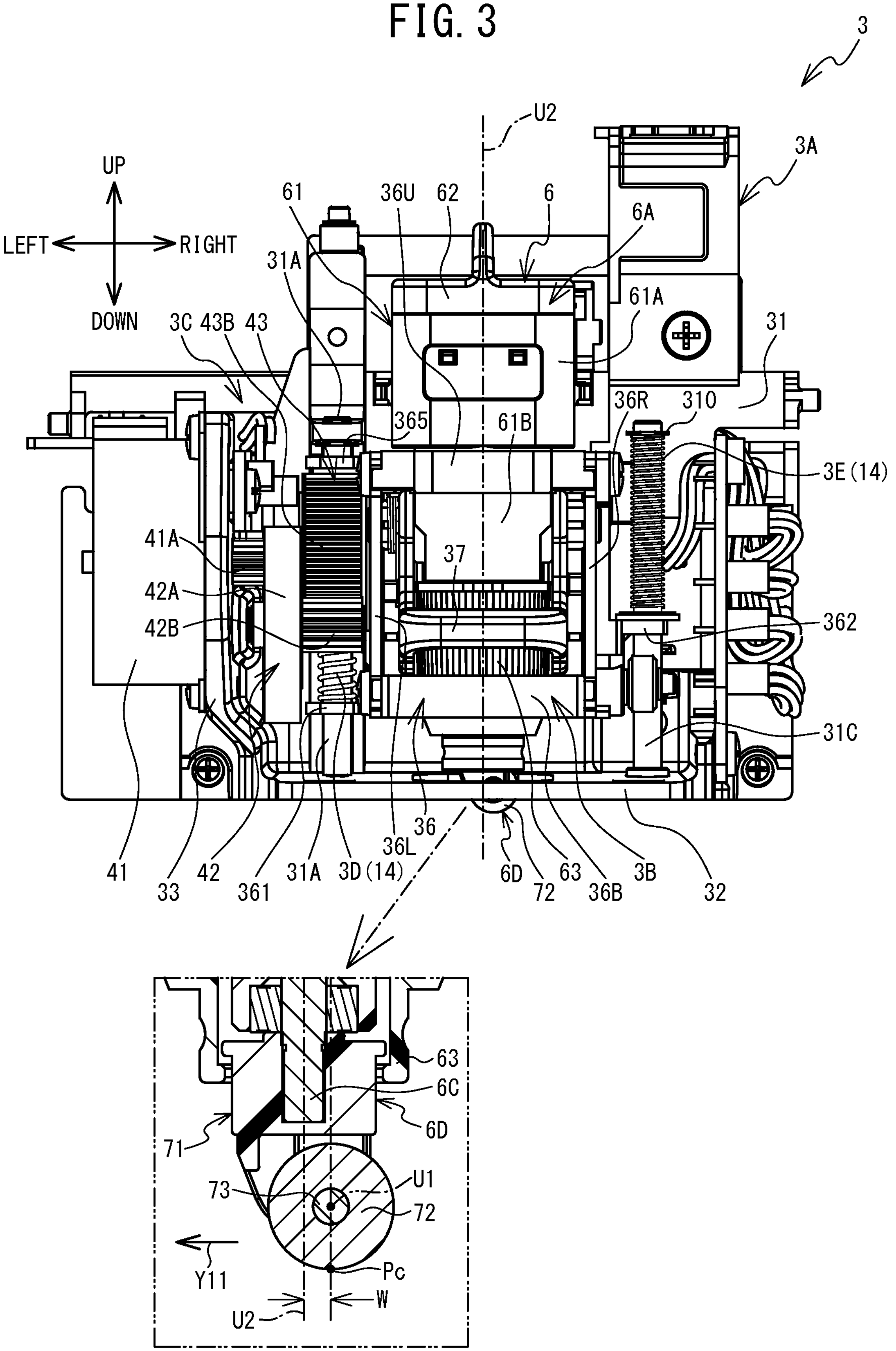
FIG. 3 is a front view of the carriage, the mounter, and the holder.

As shown in FIG. 2 and FIG. 3, the carriage 3 is provided with a support body 3A, the mounter 3B, an approaching/separating mechanism 3C, a pressure changing mechanism 14, and the like. A portion of the carriage 3 excluding a part to which the holder 6 is mounted is covered by a cover 30 shown in FIG. 1. Illustration of the cover 30 is omitted in FIG. 2 and FIG. 3. The support body 3A supports the mounter 3B, the approaching/separating mechanism 3C, the pressure changing mechanism 14, and the like. The support body 3A includes base portions 31 to 33 each having a plate shape. The base portion 31 is orthogonal to the front-rear direction. The rear surface of the base portion 31 is coupled to the guide rail 26 (refer to FIG. 1). The base portion 31 is supported by the guide rail 26 so as to be movable in the left-right direction. Support shafts 31A and 31C are provided at positions separated to the front from the base portion 31. Each of the support shafts 31A and 31C has a circular cylindrical shape, and extends in the up-down direction. As shown in FIG. 3, the support shaft 31A is provided in the vicinity of the left end portion of the base portion 31. A spring 3D of the pressure changing mechanism 14 to be described later is wound around the support shaft 31A, and the support shaft 31A supports a rack gear 43, to be described later, such that the rack gear 43 can move in the up-down direction. The support shaft 31C is provided in the vicinity of the right end portion of the base portion 31. A spring 3E of the pressure changing mechanism 14 to be described later is wound around the support shaft 31C. As shown in FIG. 2 and FIG. 3, the base portion 32 is orthogonal to the up-down direction, and extends to the front from the lower end portion of the base portion 31. A through hole 32A, which penetrates in the up-down direction, is formed in the base portion 32. The base portion 33 is orthogonal to the left-right direction, and extends forward from a position, of the base portion 31, further to the left than the support shaft 31A. A portion of the approaching/separating mechanism 3C to be described later is supported by the base portion 33.

Of the support body 3A, the mounter 3B is disposed further to the front than the base portion 31, higher than the base portion 32, further to the left than the support shaft 31C, and further to the right than the support shaft 31A. The mounter 3B includes a holding body 36 and a lever 37. The holding body 36 holds the holder 6 in a mounted state. The lever 37 fixes the holder 6 in the state of being held by the holding body 36, and causes the holder 6 to be undetachable.

As shown in FIG. 2, the holding body 36 includes side plate portions 36S, 36R, and 36L, an upper plate portion 36U, and a lower plate portion 36B. The side plate portion 36S is disposed to the front of the base portion 31 of the support body 3A, and is orthogonal to the front-rear direction. The side plate portion 36S is coupled to the base portion 31 so as to be movable with respect to the base portion 31 in the up-down direction. In this way, the mounter 3B is supported so as to be able to move in the up-down direction with respect to the support body 3A. The side plate portion 36R extends to the front from the right end portion of the side plate portion 36S. The side plate portion 36L extends to the front from the left end portion of the side plate portion 36S. The side plate portions 36R and 36L are, respectively, orthogonal to the left-right direction. The upper plate portion 36U is provided at each of the upper end portions of the side plate portions 36S, 36R, and 36L. The lower plate portion 36B is provided at each of the lower end portions of the side plate portions 36S, 36R, and 36L. The upper plate portion 36U and the lower plate portion 36B are, respectively, orthogonal to the up-down direction. The front end portion of the holding body 36 is open.

A circular through hole that penetrates in the up-down direction is formed in the upper plate portion 36U. A circular through hole that penetrates in the up-down direction is formed in the lower plate portion 36B. In the state in which the holder 6 is held by the holding body 36, the holder 6 is inserted through the through hole of the upper plate portion 36U and the through hole of the lower plate portion 36B. In this state, the upper end portion of the holder 6 protrudes further upward than the upper plate portion 36U, and the lower end portion of the holder 6 protrudes further downward than the lower plate portion 36B.

As shown in FIG. 3, a movable plate portion 361 is provided at the lower end portion of the side plate portion 36L, and a movable plate portion 365 is provided at the upper end portion of the side plate portion 36L. The movable plate portions 361 and 365 extend to the left from the left surface of the side plate portion 36L, and are orthogonal to the up-down direction. Through holes that penetrate in the up-down direction are formed in the movable plate portions 361 and 365, and the support shaft 31A of the support body 3A is inserted through the through holes. A movable plate portion 362 is provided at the side plate portion 36R. The movable plate portion 362 extends to the right from the right surface of the side plate portion 36R, and is orthogonal to the up-down direction. A through hole that penetrates in the up-down direction is formed in the movable plate portion 362, and the support shaft 31C of the support body 3A is inserted through the through hole.

As shown in FIG. 2, the lever 37 is pivotably supported by the side plate portions 36R and 36L of the holding body 36. The lever 37 includes a plate-shaped grip portion 37A that is long in the left-right direction. In a state in which the lever 37 has pivoted in a direction in which the grip portion 37A moves downward, the holder 6 held by the holding body 36 is fixed, and cannot be detached from the holding body 36. On the other hand, in a state in which the lever 37 has pivoted in a direction in which the grip portion 37A moves upward, the fixed state of the holder 6 to the holding body 36 is released. Thus, in this state, the holder 6 can be detached from the holding body 36.

Figure 4:
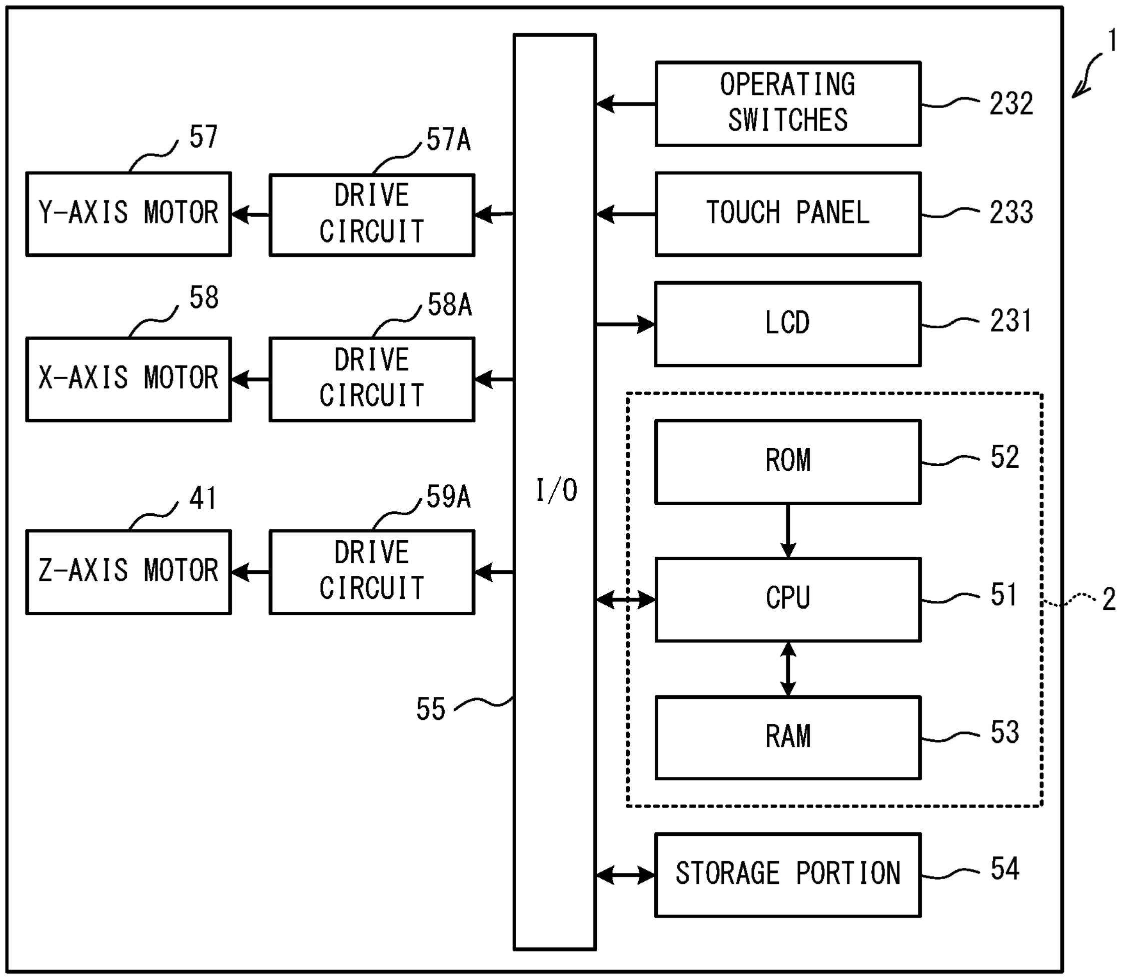
FIG. 4 is a block diagram showing an electrical configuration of the cutting device.

The approaching/separating mechanism 3C is controlled by a control portion 2 (refer to FIG. 4). The control portion 2 moves the mounter 3B in an approaching direction (downward) in which the mounter 3B is caused to approach the platen 2B, and in a separating direction (upward) in which the mounter 3B is caused to separate from the platen 2B. As a result of the mounter 3B moving downward, the mounter 3B approaches the object to be cut 9 placed on the platen 2B. As a result of the mounter 3B being moved upward, the mounter 3B separates from the object to be cut 9 placed on the platen 2B.

As shown in FIG. 2 and FIG. 3, the approaching/separating mechanism 3C includes a Z-axis motor 41, a gear unit 42, the rack gear 43, and the like. The Z-axis motor 41 is disposed to the left of the base portion 33 of the support body 3A, and is fixed to the support body 3A by the base portion 33. A rotation shaft of the Z-axis motor 41 extends to the right, and penetrates, to the right, a through hole 33A formed in the base portion 33. A gear 41A is provided at the rotation shaft of the Z-axis motor 41. The gear 41A is disposed further to the right than the base portion 33.

The gear unit 42 includes an internal gear 42A and a pinion gear 42B. The internal gear 42A has a circular plate shape, and is orthogonal to the left-right direction. A circular recessed portion that is recessed to the right is formed in the left surface of the internal gear 42A. Teeth are formed at the inner side surface of the recessed portion. The pinion gear 42B is provided at the right surface of the internal gear 42A. The diameter of the pinion gear 42B is smaller than the diameter of the internal gear 42A. Positions of centers of rotation of the internal gear 42A and the pinion gear 42B are aligned, respectively, and extend in the left-right direction. Hereinafter, the respective centers of rotation of the internal gear 42A and the pinion gear 42B are referred to as a "center of rotation of the gear unit 42." The internal gear 42A and the pinion gear 42B rotate integrally.

The gear unit 42 is provided further to the right than the base portion 33 of the support body 3A, and is rotatably supported by the base portion 33. The center of rotation of the gear unit 42 is positioned lower than the rotation shaft of the Z-axis motor 41. The gear 41A provided at the rotation shaft of the Z-axis motor 41 enters into the recessed portion provided in the left surface of the internal gear 42A, from the left, and meshes with the teeth provided at the inner side surface of the internal gear 42A. When the Z-axis motor 41 is driven and the gear 41A rotates, the driving force of the Z-axis motor 41 is transmitted to the gear unit 42 via the gear 41A and the internal gear 42A. In this way, the pinion gear 42B of the gear unit 42 also rotates.

The rack gear 43 is provided to the rear of the pinion gear 42B. The rack gear 43 includes teeth 43B provided on a front surface of a square columnar-shaped base that extends in the up-down direction. The rack gear 43 further includes, in the base, a through hole that penetrates in the up-down direction. The support shaft 31A that is fixed to the support body 3A is inserted through the through hole of the rack gear 43. The rack gear 43 can move in the up-down direction (also referred to as a "Z direction") along the support shaft 31A. The teeth 43B of the rack gear 43 mesh with the pinion gear 42B. The rack gear 43 moves in the up-down direction in accordance with the rotation of the pinion gear 42B.

The pressure changing mechanism 14 can change a pressure in the approaching direction applied to the mounter 3B. The pressure changing mechanism 14 is provided with the springs 3D and 3E. The spring 3D is positioned below the rack gear 43. The spring 3D is a compression coil spring, and is wound around the support shaft 31A in the vicinity of the lower end thereof. The upper end portion of the spring 3D is coupled to the lower end portion of the rack gear 43. The lower end portion of the spring 3D is coupled to the movable plate portion 361 of the mounter 3B. The spring 3D is interposed between the rack gear 43 and the movable plate portion 361 of the mounter 3B, and urges the rack gear 43 upward. In this way, the upper end portion of the rack gear 43 comes into contact, from below, with the movable plate portion 365 of the mounter 3B, and presses the movable plate portion 365 upward. When the Z-axis motor 41 of the approaching/separating mechanism 3C is driven, the spring 3D moves the mounter 3B in the up-down direction in concert with the movement in the up-down direction of the rack gear 43. When the spring 3D is compressed in accordance with the rack gear 43 moving downward, the spring 3D applies a downward pressure to the mounter 3B.

The spring 3E is a compression coil spring, and is wound around the support shaft 31C. The upper end portion of the spring 3E is in contact, from below, with a fixing washer 310 fixed to the upper end portion of the support shaft 31C. The lower end portion of the spring 3E is coupled to the movable plate portion 362 of the mounter 3B. The spring 3E is interposed between the fixing washer 310 and the movable plate portion 362 of the mounter 3B, and applies a downward pressure to the mounter 3B. The spring 3E applies the downward pressure to the mounter 3B, regardless of a driving state of the Z-axis motor 41 of the approaching/separating mechanism 3C.

Overview of Holder 6

The holder 6 will be described with reference to FIG. 3. The holder 6 is used in the state of being mounted to the mounter 3B, and cuts the object to be cut 9 using the cutting blade 72. The holder 6 includes a housing 6A, a shaft body 6C, and a cutting body 6D.

The housing 6A is made of resin, and houses the shaft body 6C and the cutting body 6D to be described later. The housing 6A includes a main body portion 61, a lid portion 62, and a screw cap 63. The main body portion 61 includes a square cylindrical portion 61A and a circular cylindrical portion 61B that each extend in the up-down direction. The lid portion 62 closes an opening at the upper end portion of the square cylindrical portion 61A. The circular cylindrical portion 61B is provided lower than the square cylindrical portion 61A. The screw cap 63 fits onto the lower end portion of the circular cylindrical portion 61B. Hereinafter, a straight line extending in the up-down direction along a center of the circular cylindrical portion 61B will be referred to as a "second rotation axis U2." The screw cap 63 has a circular cylindrical shape and openings are provided in both end portions thereof in the up-down direction. In the state in which the holder 6 is mounted to the mounter 3B, the housing 6A is held by the mounter 3B.

The shaft body 6C has a circular columnar shape, and extends in the up-down direction along the second rotation axis U2. The shaft body 6C is rotatably supported by the housing 6A. The shaft body 6C can rotate around the second rotation axis U2. The lower end portion of the shaft body 6C protrudes further downward than the lower end portion of the screw cap 63. The cutting body 6D is coupled to the lower end portion of the shaft body 6C.

The cutting body 6D is provided at the lower end portion of the housing 6A. The cutting body 6D includes a support portion 71, the cutting blade 72, a spindle 73, and the like. The support portion 71 is coupled to the lower end portion of the shaft body 6C. The support portion 71 can rotate around the second rotation axis U2 with respect to the mounter 3B, in accordance with the shaft body 6C rotating in the state in which the holder 6 is mounted to the mounter 3B. The support portion 71 holds the circular columnar shaped spindle 73. The spindle 73 extends in an XY direction. A straight line extending in the XY direction along the spindle 73 will be referred to as a "first rotation axis U1." The first rotation axis U1 and the second rotation axis U2 are separated in the XY direction. Thus, even when the support portion 71 rotates around the second rotation axis U2, the first rotation axis U1 never intersects the second rotation axis U2. A distance in the XY direction between the first rotation axis U1 and the second rotation axis U2 will be referred to as a "distance W." The cutting blade 72 has a circular plate shape, and can cut the object to be cut 9 using a peripheral edge portion thereof. A through hole is formed at the center of the cutting blade 72. The spindle 73 is inserted through the through hole of the cutting blade 72. The cutting blade 72 is rotatable supported by the support portion 71, via the spindle 73. The center of rotation of the cutting blade 72 is aligned with the first rotation axis U1.

When cutting the object to be cut 9, the holder 6 held by the mounter 3B moves in the XY direction relative to the holding portion 90 holding the object to be cut 9. At that time, the cutting body 6D rotates around the second rotation axis U2 in accordance with the direction of the relative movement of the holder 6. More specifically, when the holder 6 relatively moves in a direction indicated by an arrow Y11, for example, the cutting body 6D rotates such that the first rotation axis U1 is disposed on the opposite side, with respect to the second rotation axis U2, from the side oriented toward the arrow Y11. The first rotation axis U1 is orthogonal to the arrow Y11. In this state, the cutting blade 72 cuts the object to be cut 9 while rotating around the first rotation axis U1. Of the lower end portion of the cutting blade 72, a portion directly below the first rotation axis U1 will be referred to as a "cutting position Pc of the cutting blade 72." The cutting blade 72 cuts the object to be cut 9 at the cutting position Pc. At this time, in the XY direction, a cut portion of the object to be cut 9 that is cut by the cutting blade 72 extends from the cutting position Pc in the opposite direction to the relative movement direction of the second rotation axis U2 (the direction of the arrow Y11, for example). In other words, when the cutting blade 72 is controlled, using the second rotation axis U2 as a reference and without taking a surplus cutting amount into account, an error occurs in the distance W.

Hereinafter, a type of holder in which the first rotation axis U1 that is the rotation axis of the cutting blade 72 and the second rotation axis U2 that is the rotation axis of the cutting body 6D do not intersect each other, as with the above-described holder 6, will be referred to as an "eccentric-type holder." In contrast to this, a type of holder in which the first rotation axis U1 that is the rotation axis of the cutting blade 72 and the second rotation axis U2 that is the rotation axis of the cutting body 6D intersect each other will be referred to as a "coaxial-type holder."

Electrical Configuration

The electrical configuration of the cutting device 1 will be described with reference to FIG. 4. The cutting device 1 is provided with a CPU 51, a ROM 52, a RAM 53, and an input/output (I/O) interface 55. The CPU 51 is electrically connected to the ROM 52, the RAM 53, and the I/O interface 55. The CPU 51 configures the control portion 2, along with the ROM 52 and the RAM 53. The CPU 51 performs main control of the cutting device 1. The ROM 52 stores various programs and the like for operating the cutting device 1. The programs include a program for causing the cutting device 1 to perform main processing (refer to FIG. 8) to be described later, for example. The RAM 53 temporarily stores various data, setting values input by operation of the operating switches 232, and mathematical results from arithmetic processing performed by the CPU 51 and the like. Further, a storage 54, the operating switches 232, the touch panel 233, the LCD 231, and drive circuits 57A, 58A, and 59A are connected to the I/O interface 55. The storage 54 is anon-volatile storage element. The storage 54 stores various parameters, cutting data to be described later, and the like.

The control portion 2 controls the LCD 231 and causes the LCD 231 to display the images. The LCD 231 can perform notification of various commands. The drive circuits 57A, 58A, and 59A respectively drive the Y-axis motor 57, the X-axis motor 58, and the Z-axis motor 41. The control portion 2 controls the Y-axis motor 57, the X-axis motor 58, the Z-axis motor 41, and the like on the basis of the cutting data. In this way, the control portion 2 moves the cutting blade 72 relative to the holding portion 90, and cuts the object to be cut 9 placed on the holding portion 90, along the cutting line.

Cutting Data

Figure 5:
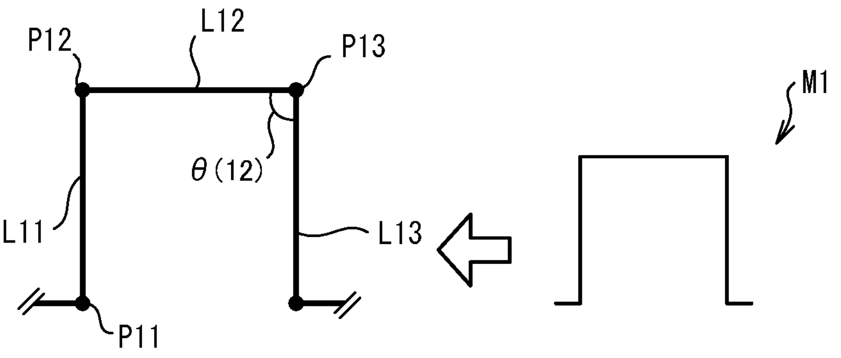
FIG. 5 is a diagram showing cutting lines, and cutting data.
Figure 6:
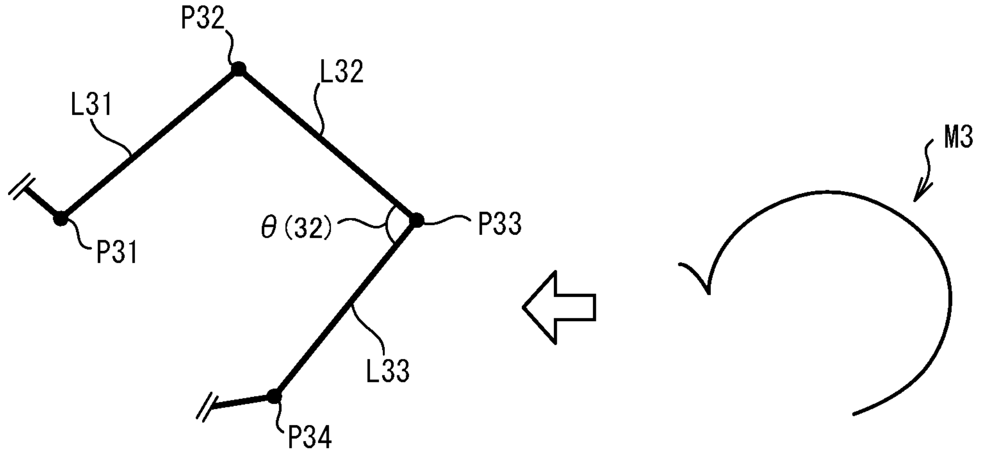
FIG. 6 is a diagram showing cutting lines and cutting data.

Cutting data D will be described with reference to FIG. 5 and FIG. 6. The cutting data D is data for cutting the object to be cut 9, using the cutting blade 72, by the control portion 2 controlling the conveyance mechanism 2C and the movement mechanism 2D. The cutting data D is stored in the storage 54 as the data for cutting a desired pattern (referred to as a "cutting pattern M") specified by the user, and is stored for each of the cutting patterns M. The cutting data D includes coordinate data and cutting line data. FIG. 5 shows cutting data D1 for cutting a cutting pattern M1. FIG. 6 shows cutting data D3 for cutting a cutting pattern M3.

The coordinate data indicates, using a cutting coordinate system set inside a cuttable region, relative positions of points of ends of each of a plurality of line segments (hereinafter each is generically referred to as a "cutting line L") corresponding to a plurality of sections obtained by dividing up the cutting pattern M. The cuttable region shows a maximum region in which the cutting of the object to be cut 9 is possible by the cutting device 1. For example, the cutting data D1 shown in FIG. 5 includes the coordinate data indicating each of points P11, P12, P13, and so on. The point P11 indicates the relative position of the point at one of both ends of a cutting line L11. The point P12 indicates the relative positions of the point at the other of both the ends of the cutting line L11, and of the point at one end of both ends of a cutting line L12, respectively. The point P13 indicates the relative positions of the point at the other of both the ends of the cutting line L12, and of the point at one of both ends of a cutting line L13, respectively. An index indicating a cutting order is associated with each piece of the coordinate data.

The control portion 2 controls the conveyance mechanism 2C and the movement mechanism 2D and relatively moves the mounter 3B, such that the positions of each of the points indicated by the coordinate data are aligned with the position of the second rotation axis U2 (refer to FIG. 3) of the holder 6, in the XY direction. The control portion 2 identifies the cutting order of each of the plurality of points indicated by the coordinate data, and repeats the control to relatively move the mounter 3B such that the identified position is aligned with the second rotation axis U2 of the holder 6.

The cutting blade 72 of the holder 6 relatively moves from the point (a start point) indicated by the coordinate data to the next point (an end point), and cuts the object to be cut 9 along the cutting line L that joins the start point and the end point in a straight line. The cutting pattern M is cut as a result of this operation being repeated.

The cutting line data includes the cutting line L, and attributes associated with the cutting line L. A first attribute indicating that the cutting line L is a straight line, and a second attribute indicating the that cutting line L is a curved line are types of the attribute. An index indicating the cutting order is associated with the cutting line L.

For example, as shown in FIG. 5, in the cutting data D1 for cutting the cutting pattern M1, the attributes of the cutting line L11 joining the points P11 and P12, and of the cutting line L12 joining the points P12 and P13 are both the first attribute. In this case, of the cutting pattern M1, this indicates that both of portions corresponding to the cutting lines L11 and L12 are straight lines. On the other hand, as shown in FIG. 6, in the cutting data D3 for cutting the cutting pattern M3, the attributes of a cutting line L31 joining points P31 and P32, a cutting line L32 joining the point P32 and a point P33, and a cutting line L33 joining the point P33 and point P34 are all the second attribute. In this case, of the cutting pattern M3, this indicates that all of portions corresponding to the cutting lines L31, L32, and L33 are curved lines.

Further, the cutting line data includes a curvature and a length set for the cutting line L for which the attribute is the second attribute. The curvature indicates the curvature of the portion corresponding to the cutting line L, of the cutting pattern M. The length indicates the length of the cutting line L. For example, in the cutting data D3 shown in FIG. 6, of the cutting pattern M3, the respective curvatures of the portions corresponding to the cutting lines L31, L32, and L33 are r31, r32, and r33. The respective lengths of the cutting lines L31, L32, and L33 are s31, s32, and s33.

Correction of Cutting Data

As shown in FIG. 3, the first rotation axis U1 of the holder 6 and the second rotation axis U2 do not intersect, and are separated by the distance W in the XY direction. Thus, when, based on the coordinate data, the control portion 2 has relatively moved the mounter 3B such that the second rotation axis U2 moves from the point P11 to the point P12, for example, the cutting position Pc of the cutting blade 72 relatively moves to a position separated by the distance W to the side of the point P11 with respect to the point P12. In other words, the cutting position Pc of the cutting blade 72 does not reach the point P12. Thus, there is a possibility that the object to be cut 9 is not appropriately cut along the cutting line L11, and that an uncut portion remains due to the cutting being insufficient.

Thus, in order to suppress the occurrence of the uncut portion remaining, the control portion 2 changes the position of the end point and corrects the cutting line L. More specifically, the control portion 2 decides a corrected end point that is separated, from the end point of the cutting line L, to the opposite side of the end point from the start point side. On the basis of the decided corrected end point, the control portion 2 further decides a corrected cutting line La obtained by correcting the cutting line L. By moving the mounter 3B on the basis of the decided correcting cutting line La, the control portion 2 can cause the cutting position Pc of the cutting blade 72 of the holder 6 to reach the end point of the pre-correction cutting line L. In this way, the control portion 2 can suppress the occurrence of the uncut portion remaining, and can appropriately cut the object to be cut 9 along the cutting line L.

Furthermore, when performing the main processing to be described later and cutting the object to be cut 9, the control portion 2 decides a length between the end point and the corrected end point (hereinafter referred to as a "surplus cutting length") on the basis of the attribute, the curvature, and the length of the cutting line L, on angle between the cutting line L and the next cutting line L, and the like. Candidates for the decided surplus cutting length are stored in advance in the storage 54.

FIG. 7 is a table T showing surplus cutting lengths B(1) and B(2), and C(1) to C(6) stored in the storage 54. The surplus cutting lengths B(1) and B(2), and C(1) to C(6) are set so as to have magnitude correlations shown by (a) to (d) below.

$$B(1)>B(2) \quad (a)$$

$$C(1)>C(2)\geq C(3)\geq C(4)\geq C(5)\geq C(6) \quad (b)$$

$$B(1)\geq C(1) \quad (c)$$

$$C(1)\geq B(2)\geq C(2) \quad (d)$$

Main Processing

The main processing will be described with reference to FIG. 8 and FIG. 9. The main processing is started by the control portion 2 reading out and executing the program stored in the ROM 52, when a start operation that specifies the cutting pattern M and starts to cut the object to be cut 9 is detected via the touch panel 233.

The control portion 2 detects, via the touch panel 233, a setting operation that sets the type of the holder (the coaxial type or the eccentric type) to be mounted to the mounter 3B. On the basis of the detected setting operation, the control portion 2 receives the type of the holder (step S1). When it is determined that the received type of the holder is the coaxial type (no at step S3), the control portion 2 advances the processing to step S25 in order to cut the object to be cut 9 using the cutting data D without change. When it is determined that the acquired type of the holder is the eccentric type (yes at step S3), the control portion 2 advances the processing to step S11 in order to correct the cutting data D.

The control portion 2 reads out and acquires, from the storage 54, the cutting data D corresponding to the cutting pattern M specified at the start of the operation. On the basis of the cutting line data included in the acquired cutting data D, the control portion 2 selects one of the cutting lines L in accordance with the cutting order (step S11). Hereinafter, the cutting line L selected by the processing at step S11 will be referred to as a "first cutting line." Furthermore, the control portion 2 acquires the attribute associated with the first cutting line (step S11).

The control portion 2 determines whether a type of the acquired attribute is the first attribute (the straight line) (step S13). When it is determined that the acquired attribute is the first attribute (yes at step S13), the control portion 2 identifies, on the basis of the cutting line data in the cutting data D, the cutting line L to be cut subsequently to the first cutting line (hereinafter referred to as a "second cutting line"). The control portion 2 calculates an angle θ between the first cutting line and the second cutting line. The control portion 2 determines whether the calculated angle θ is smaller than a predetermined first threshold value Th1 (step S15).

Figure 10:
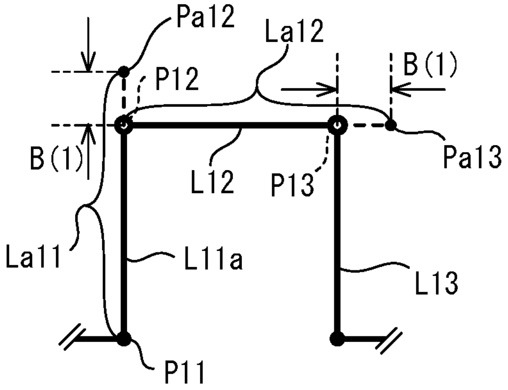
FIG. 10 is a diagram showing corrected cutting lines and corrected cutting data.
Figure 11:
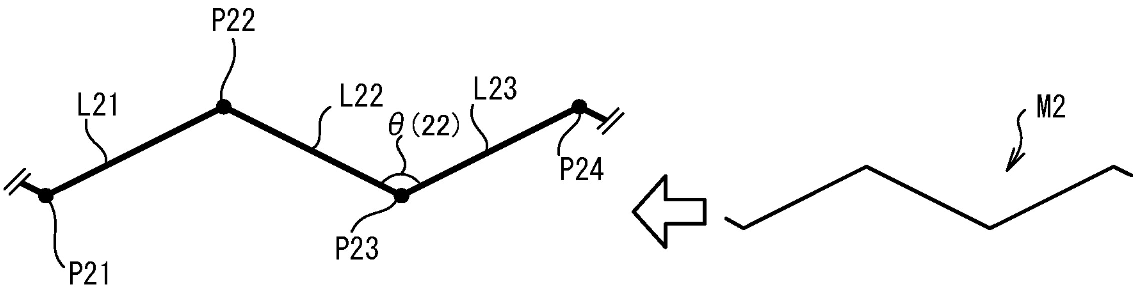
FIG. 11 is a diagram showing cutting lines and cutting data.
Figure 12:
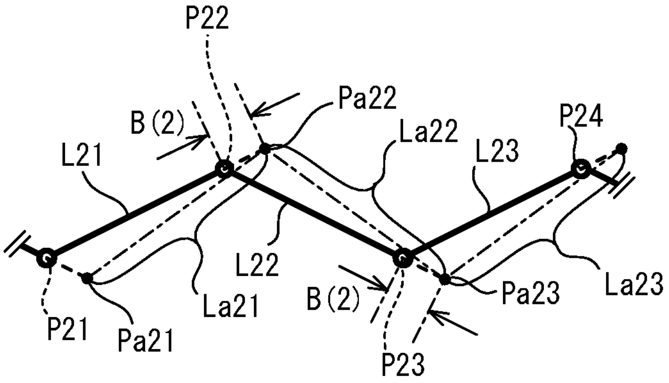
FIG. 12 is a diagram showing corrected cutting lines and corrected cutting data.

For example, as shown in FIG. 5, when it is determined that the angle θ (12) between the cutting line L12 (the first cutting line) and the cutting line L13 (the second cutting line) is smaller than the first threshold value Th1 (yes at step S15), the control portion 2 decides the surplus cutting length B(1) (refer to FIG. 7, t11), as the surplus cutting length for correcting the point P13, which is the end point of the cutting line L12, to a corrected end point (a point Pa13), as shown in FIG. 10 (step S17). The control portion 2 advances the processing to step S21. On the other hand, for example, when, as shown in FIG. 11 (cutting data D2 for cutting a cutting pattern M2), it is determined that the angle θ (22) between a cutting line L22 (the first cutting line) and a cutting line L23 (the second cutting line) is equal to or greater than the first threshold value Th1 (no at step S15), the control portion 2 decides the surplus cutting length B(2) (refer to FIG. 7, t12), as the surplus cutting length for correcting a point P23, which is the end point of the cutting line L22, to a corrected end point (a point Pa23), as shown in FIG. 12 (step S19). The control portion 2 advances the processing to step S21.

Figure 9:
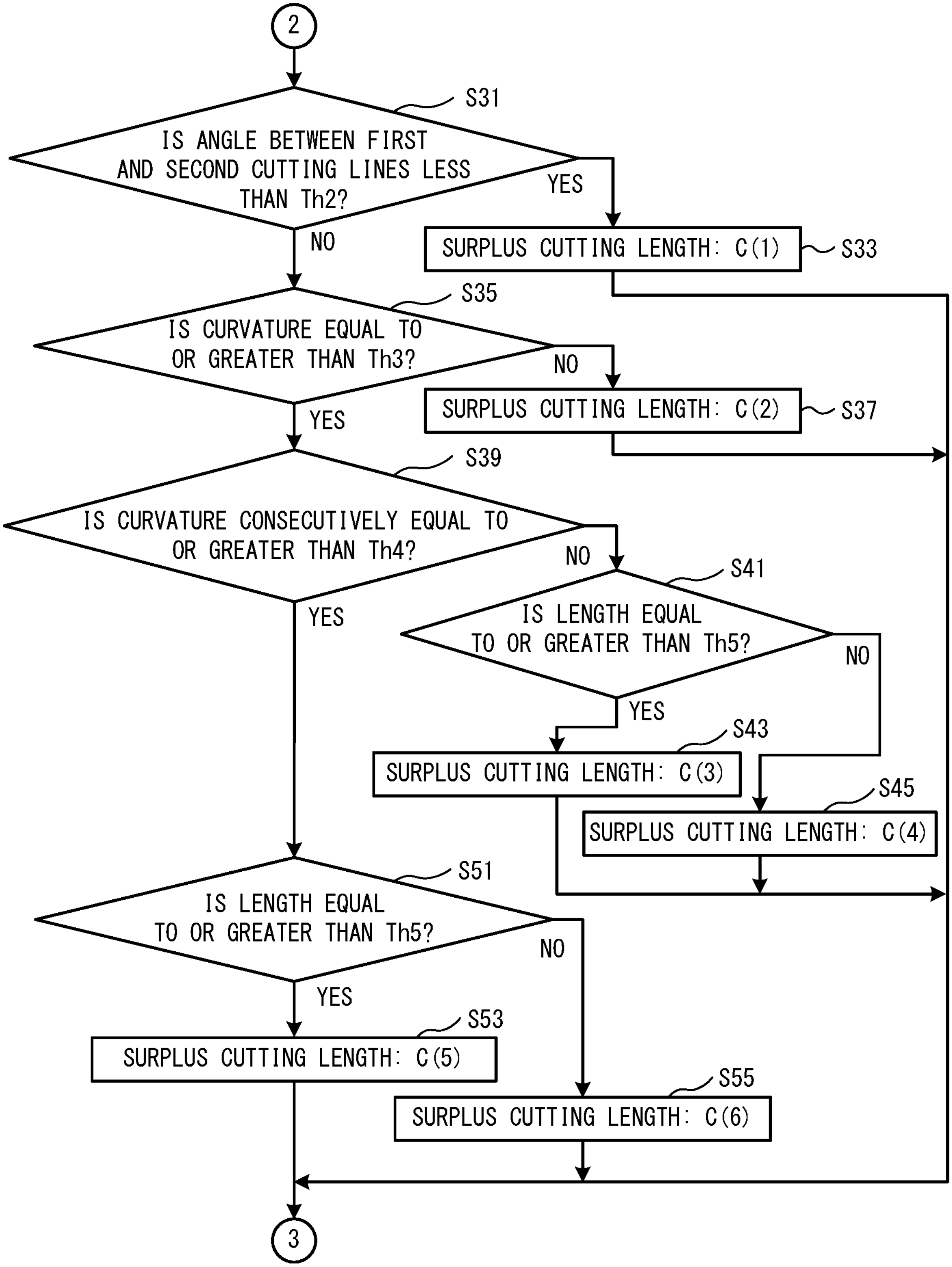
FIG. 9 is a flowchart of the main processing and is a continuation of FIG. 8.

When it is determined that the type of the attribute acquired by the processing at step S11 is the second attribute (the curved line) (no at step S13), the control portion 2 advances the processing to step S31 (refer to FIG. 9).

As shown in FIG. 9, on the basis of the cutting line data of the cutting data D, the control portion 2 identifies the second cutting line and calculates the angle θ between the first cutting line and the second cutting line. The control portion 2 determines whether the calculated angle θ is smaller than a predetermined second threshold value Th2 (step S31).

Figure 13:
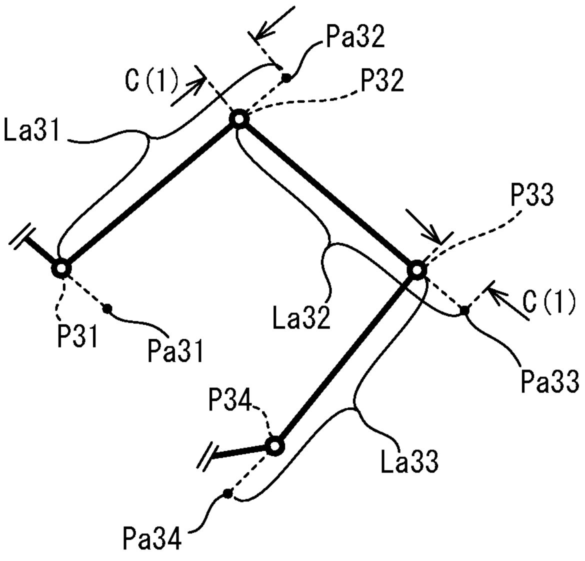
FIG. 13 is a diagram showing corrected cutting lines and corrected cutting data.
Figure 14:
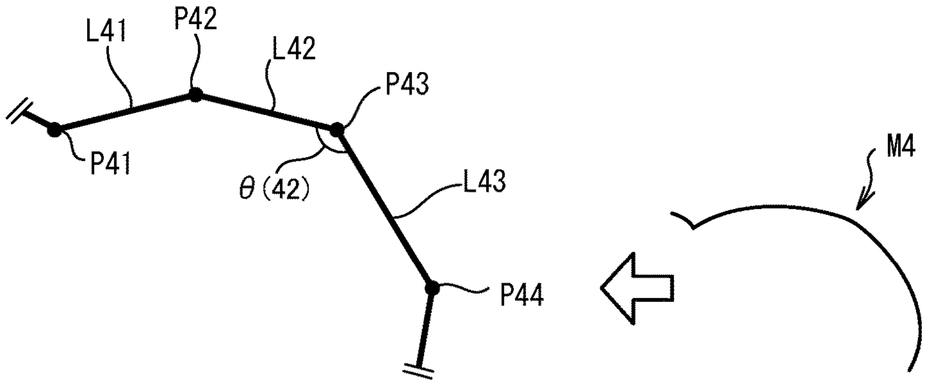
FIG. 14 is a diagram showing cutting lines and cutting data.
Figure 15:
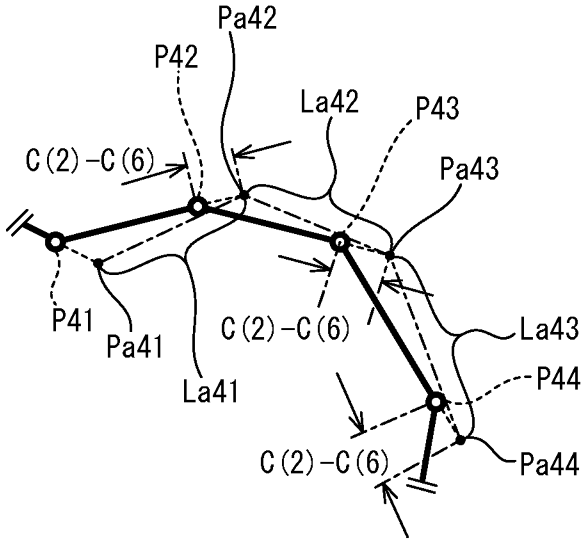
FIG. 15 is a diagram showing corrected cutting lines and corrected cutting data.

For example, as shown in FIG. 6, when it is determined that the angle θ (32) between a cutting line L32 (the first cutting line) and a cutting line L33 (the second cutting line) is smaller than the second threshold value Th2 (yes at step S31), the control portion 2 decides the surplus cutting length C(1) (refer to FIG. 7, t21), as the surplus cutting length for correcting a point P33, which is the end point of the cutting line L32, to a corrected end point (a point Pa33), as shown in FIG. 13 (step S33). The control portion 2 advances the processing to step S21 (refer to FIG. 8). On the other hand, for example, when, as shown in FIG. 14 (cutting data D4 for cutting a cutting pattern M4), it is determined that the angle θ (42) between a cutting line L42 (the first cutting line) and a cutting line L43 (the second cutting line) is equal to or greater than the second threshold value Th2 (no at step S31), the control portion 2 advances the processing to step S35. In this case, by processing at step S37, step S43, step S45, step S53, and step S55 to be described later, the control portion 2 decides one of the surplus cutting lengths C(2) to C(6) as the surplus cutting length for correcting a point P43, which is the end point of the cutting line L42, to a corrected end point (a point Pa43), as shown in FIG. 15. This is described next in more detail.

As shown in FIG. 9, in the cutting line data of the cutting data D, the control portion 2 determines whether the curvature associated with the first cutting line is equal to or greater than a predetermined third threshold value Th3 (step S35). When it is determined that the curvature is smaller than the third threshold value Th3 (no at step S35), the control portion 2 decides on the surplus cutting length C(2) (refer to FIG. 7, t22) (step S37). The control portion 2 returns the processing to step S21 (refer to FIG. 8).

When it is determined that the curvature associated with the first cutting line is equal to or greater than the third threshold value Th3 (yes at step S35), the control portion 2 decides whether, in the cutting line data of the cutting data D, both the curvatures respectively associated with the first cutting line and the second cutting line are equal to or greater than a predetermined fourth threshold value Th4 (step S39). When it is determined that at least one of the curvature associated with the first cutting line or at least one of the curvature associated with the second cutting line is smaller than the fourth threshold value Th4 (no at step S39), the control portion 2 advances the processing to step S41.

The control portion 2 identifies, in the cutting line data of the cutting data D, the length associated with the first cutting line. The control portion 2 determines whether the identified length is equal to or greater than a predetermined fifth threshold value Th5 (step S41). When it is determined that the identified length is equal to or greater than the fifth threshold value Th5 (yes at step S41), the control portion 2 decides on the surplus cutting length C(3) (refer to FIG. 7, t23) (step S43). The control portion 2 returns the processing to step S21 (refer to FIG. 8). When it is determined that the identified length is smaller than the fifth threshold value Th5 (no at step S41), the control portion 2 decides on the surplus cutting length C(4) (refer to FIG. 7, t24) (step S45). The control portion 2 returns the processing to step S21 (refer to FIG. 8).

When it is determined that the curvatures respectively associated with the first cutting line and the second cutting line are both equal to or greater than the fourth threshold value Th4 (yes at step S39), the control portion 2 advances the processing to step S51.

The control portion 2 identifies, in the cutting line data of the cutting data D, the length associated with the first cutting line. The control portion 2 determines whether the identified length is equal to or greater than the predetermined fifth threshold value Th5 (step S51). When the identified length is equal to or greater than the fifth threshold value Th5 (yes at step S51), the control portion 2 decides on the surplus cutting length C(5) (refer to FIG. 7, t25) (step S53). The control portion 2 returns the processing to step S21 (refer to FIG. 8). When it is determined that the identified length is smaller than the fifth threshold value Th5 (no at step S51), the control portion 2 decides on the surplus cutting length C(6) (refer to FIG. 7, t26) (step S55). The control portion 2 returns the processing to step S21 (refer to FIG. 8).

Figure 8:
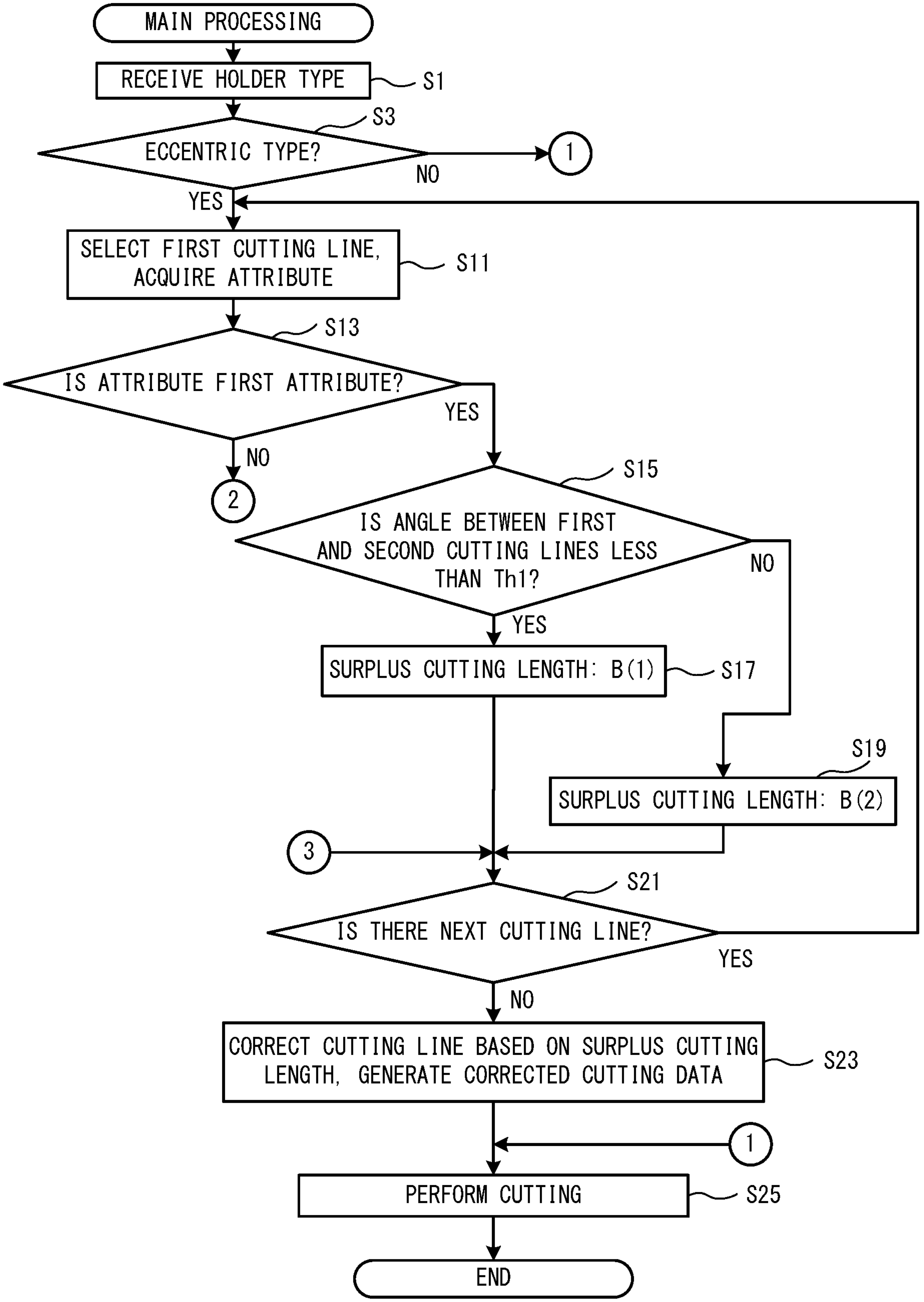
FIG. 8 is a flowchart of main processing.

As shown in FIG. 8, the control portion 2 determines whether the cutting line L subsequent to the second cutting line in the cutting order is included in the cutting line data of the cutting data D (step S21). When it is determined that the cutting line L subsequent to the second cutting line in the cutting order is included in the cutting line data of the cutting data D (yes at step S21), the control portion 2 returns the processing to step S11. The control portion 2 selects, in the cutting order, one of the cutting lines L that has not been selected as the first cutting line (step S11), and repeats the processing at step S13 to step S21 and step S31 to step S55. When it is determined that the cutting line L subsequent to the second cutting line in the cutting order is not included in the cutting line data of the cutting data D (no at step S21), the control portion 2 advances the processing to step S23.

The control portion 2 corrects the cutting line L on the basis of the surplus cutting length decided by the processing at one of step S17, step S19, step S33, step S37, step S43, step S45, step S53, and step S55, and identifies the corrected cutting line La (step S23). On the basis of the cutting data, the control portion 2 generates corrected cutting data for cutting the object to be cut 9 along the corrected cutting line La, as described below (step S23). Note that the correction method when correcting the cutting line L differs between when the angle θ between the first cutting line and the second cutting line is less than the first threshold value Th1 and when the angle θ between the first cutting line and the second cutting line is equal to or greater than the first threshold value Th1.

When the attribute of the cutting line L12 is the first attribute and the angle θ (12) between the cutting line L12 and the cutting line L13 is smaller than the first threshold value Th1 as shown in FIG. 5, the point Pa13 separated, by the surplus cutting length B(1), from the point P13 that is the end point of the cutting line L12 to the opposite side from the point P12 that is the start point of the cutting line L12, is identified as the corrected end point as shown in FIG. 10. Furthermore, a line segment joining the point Pa13 and the point P12, which is the end point of the cutting line L11 immediately preceding in the cutting order, is identified as a corrected cutting line La12 obtained by correcting the cutting line L12. Using the identified corrected cutting line La12, the control portion 2 corrects the cutting line data of the cutting data D1. Further, using the coordinate data indicating the points at both ends of the identified corrected cutting line La12, the control portion 2 corrects the coordinate data of the cutting data D1. The cutting data D1 corrected in the manner described above corresponds to corrected cutting data Da1.

Note that, although a detailed description is omitted here, when the attribute of the cutting line L32 is the second attribute and the angle θ (32) between the cutting line L32 and the cutting line L33 is smaller than the first threshold value Th1 as shown in FIG. 6, using the same method, the cutting data D3 is corrected on the basis of the surplus cutting length C(1), and corrected cutting data Da3 is generated (refer to FIG. 13).

On the other hand, when the attribute of the cutting line L22 is the first attribute and the angle θ (22) between the cutting line L22 and the cutting line L23 is equal to or greater than the first threshold value Th1 as shown in FIG. 11, the point Pa23 separated, by the surplus cutting length B(2), from the point P23 that is the end point of the cutting line L22 to the opposite side from the point P22 that is the start point of the cutting line L22, is identified as the corrected end point as shown in FIG. 12. Furthermore, a line segment joining the point Pa23 and the point Pa22, which is the end point of the corrected cutting line La21 obtained by correcting the cutting line L21 immediately preceding in the cutting order, is identified as a corrected cutting line La22 obtained by correcting the cutting line L22. Using the identified corrected cutting line La22, the control portion 2 corrects the cutting line data of the cutting data D2. Further, using the coordinate data indicating the points at both ends of the identified corrected cutting line La22, the control portion 2 corrects the coordinate data of the cutting data D2. The cutting data D2 corrected in the manner described above corresponds to corrected cutting data Da2.

Note that, although a detailed description is omitted here, when the attribute of the cutting line L42 is the second attribute and the angle θ (42) between the cutting line L42 and the cutting line L43 is less than the first threshold value Th1 as shown in FIG. 14, using the same method, the cutting data D4 is corrected on the basis of the surplus cutting lengths C(2) to C(6), and corrected cutting data Da4 is generated (refer to FIG. 15).

As shown in FIG. 8, the control portion 2 controls the conveyance mechanism 2C and the movement mechanism 2D and relatively moves the mounter 3B, on the basis of the coordinate data of the cutting data D, or the coordinate data of the corrected cutting data Da. The control portion 2 identifies, in the cutting order, each of the plurality of points indicated by the coordinate data, and repeats the control to relatively move the mounter 3B such that the identified position and the second rotation axis U2 of the holder 6 are aligned with each other. In this way, the control portion 2 cuts the object to be cut 9 (step S25). The control portion 2 ends the main processing.

Operations and Effects of Present Embodiment

The cutting device 1 decides the surplus cutting length in accordance with the attribute of the cutting line L (the first attribute or the second attribute) (step S17, step S19, step S33, step S37, step S43, step S45, step S53, step S55). The cutting device 1 corrects the cutting line L (step S23) on the basis of the decided surplus cutting length, and cuts the object to be cut 9 (step S25). Thus, the cutting device 1 can improve the accuracy when cutting the object to be cut 9.

The surplus cutting length B(1) decided when the attribute of the cutting line L is the first attribute is equal to or greater than the surplus cutting lengths C(1) to C(6) decided when the attribute of the cutting line L is the second attribute (B(1)≥C(1) to C(6), refer to magnitude correlations (b) and (c)). Further, the surplus cutting length B(2) decided when the attribute of the cutting line L is the first attribute is equal to or greater than the surplus cutting lengths C(2) to C(6) decided when the attribute of the cutting line L is the second attribute (B(2)≥C(2) to C(6), refer to magnitude correlations (b) and (d)). In this way, the cutting device 1 can decide the appropriate surplus cutting length, in accordance with whether it is indicated that the cutting line L is the straight line (the first attribute) or the curved line (the second attribute).

Note that the accuracy is likely to deteriorate when cutting the cutting line L for which the attribute is the first attribute, and the accuracy is unlikely to deteriorate when cutting the cutting line L for which the attribute is the second attribute. In response to this, the cutting device 1 causes the surplus cutting length B(1) when cutting the cutting line L for which the attribute is the first attribute to be equal to or greater than the surplus cutting lengths C(1) to C(6) when cutting the cutting line L for which the attribute is the second attribute, and causes the surplus cutting length B(2) when cutting the cutting line L for which the attribute is the first attribute to be equal to or greater than the surplus cutting lengths C(2) to C(6) when cutting the cutting line L for which the attribute is the second attribute. In this way, when cutting the object to be cut 9 along the cutting line L, the cutting device 1 can optimize the surplus cutting length in accordance with the attribute of the cutting line L, and can thus improve the accuracy of the cutting.

The cutting device 1 causes the surplus cutting length B(1) decided when the angle θ between the first cutting line, for which the attribute is the first attribute, and the second cutting line is less than the first threshold value Th1 to be greater than the surplus cutting length B(2) decided when the angle θ is equal to or greater than the first threshold value Th1 (B(1)>B(2), refer to magnitude correlation (a)). Further, the cutting device 1 causes the surplus cutting length C(1) decided when the angle θ between the first cutting line, for which the attribute is the second attribute, and the second cutting line is less than the second threshold value Th2 to be greater than the surplus cutting lengths C(2) to C(6) when the angle θ is equal to or greater than the second threshold value Th2 (C(1)>C(2) to C(6), refer to magnitude correlation (b)). In this way, the cutting device 1 can decide the appropriate surplus cutting length in accordance with the angle θ between the first cutting line and the second cutting line.

Note that the greater the value of the angle θ between the first cutting line and the second cutting line that are cut consecutively, the more likely the cutting becomes insufficient, and the more likely the uncut portion remains as a result of the intersection between the first cutting line and the second cutting line being lost. In response to this, the cutting device 1 can effectively suppress the uncut portion from remaining by increasing the surplus cutting length the larger the angle θ between the first cutting line and the second cutting line.

The cutting device 1 causes the surplus cutting lengths C(3) to C(6) decided when the curvature set for the cutting line L of the second attribute is equal to or greater than the third threshold value Th3, to be equal to or less than the surplus cutting length C(2) decided when the curvature is smaller than the third threshold value Th3 (C(2)≥C(3) to C(6), refer to magnitude correlation (b)). In this way, the cutting device 1 can decide the appropriate surplus cutting length in accordance with the curvature set for the cutting line L of the second attribute.

Note that when the surplus cutting length is always the same length, the larger the curvature set for the cutting line L, compared to when the curvature is small, the more likely the corrected cutting line La is to bulge in a direction opposite to a center of the curvature, and a positional displacement between the cutting line L and the corrected cutting line La becomes larger. In response to this, the cutting device 1 can suppress the positional displacement between the cutting line L and the corrected cutting line La, by reducing the surplus cutting length the greater the curvature set for the cutting line L.

The cutting device 1 causes the surplus cutting lengths C(5) and C(6) decided when the respective curvatures of the first cutting line and the second cutting line are both equal to or greater than the fourth threshold value Th4 to be equal to or less than the surplus cutting lengths C(3) and C(4) decided when one of the respective curvatures of the first cutting line and the second cutting line is smaller than the fourth threshold value Th4 (C(3), C(4)≥C(5), C(6), refer to magnitude correlation (b)). In this way, the cutting device 1 can decide the appropriate surplus cutting length in accordance with the respective curvatures of the first cutting line and the second cutting line.

Note that when the surplus cutting length is always the same length, the larger the curvature set for the cutting line L, compared to when the curvature is small, the more likely the corrected cutting line La is to bulge in the direction opposite to the center of the curvature, and the positional displacement between the cutting line L and the corrected cutting line La becomes larger. In response to this, the cutting device 1 can further suppress the positional displacement between the cutting line L and the corrected cutting line La, by causing the surplus cutting lengths C(5) and C(6) decided when the respective curvatures of the first cutting line and the second cutting line are both equal to or greater than the fourth threshold value Th4 to be smaller than the surplus cutting lengths C(3) and C(4) decided when one of the respective curvatures of the first cutting line and the second cutting line is smaller than the fourth threshold value Th4.

When the respective curvatures of the first cutting line and the second cutting line are equal to or greater than the fourth threshold value Th4, the cutting device 1 causes the surplus cutting length C(5) decided when the length of the first cutting line is equal to or greater than the fifth threshold value Th5 to be equal to or greater than the surplus cutting length C(6) decided when the length of the first cutting line is shorter than the fifth threshold value Th5 (C(5)≥C(6), refer to magnitude correlation (b)). Further, when at least one of the curvature of the first cutting line or at least one of the curvature of the second cutting line is smaller than the fourth threshold value Th4, the cutting device 1 causes the surplus cutting length C(3) decided when the length of the first cutting line is equal to or greater than the fifth threshold value Th5 to be equal to or greater than the surplus cutting length C(4) decided when the length of the first cutting line is smaller than the fifth threshold value Th5 (C(3)≥C(4), refer to magnitude correlation (b)). In this way, the cutting device 1 can decide the appropriate surplus cutting length in accordance with the length of the first cutting line.

Note that the longer the length of the cutting line, the more likely the uncut portion is to remain due to the insufficient cutting. In response to this, the cutting device 1 can improve the accuracy of the cutting by causing the surplus cutting lengths C(3) and C(5) when the length of the cutting line is long to be larger than the surplus cutting lengths C(4) and C(6) when the length of the cutting line is short.

The cutting device 1 decides, as the surplus cutting length, the length between the end point and the corrected end point that is separated, from the end point of the cutting line L, to the opposite side from the side of the start point. On the basis of the decided surplus cutting length, the cutting device 1 corrects the cutting line L and creates the corrected cutting line La, and generates the corrected cutting data Da that cuts the object to be cut 9 along the corrected cutting line La. In this case, the cutting device 1 can reduce the possibility of the cutting line, when the object to be cut 9 is cut, from becoming shorter than the line segment joining the start point and the end point. Thus, the cutting device 1 can accurately cut the line segment joining the start point and the end point, as the cutting line L.

In the holder 6, since the first rotation axis U1 and the second rotation axis U2 do not intersect each other, there is a greater possibility that the cutting line L when the object to be cut 9 has actually been cut becomes shorter than the line segment joining the start point and the end point. In response to this, since the cutting device 1 correct the cutting data D when this type of the holder 6 is used, and generates the corrected cutting data Da, the cutting device 1 can improve the accuracy at the time of cutting.

MODIFIED EXAMPLES

The present disclosure is not limited to the above-described embodiment, and various modifications are possible. The cutting device 1 may cut the object to be cut 9 placed on the holding portion 90, using the cutting blade 72, by moving the mounter 3B in the XY direction with respect to the fixed holding portion 90.

In the cutting line data of the cutting data D, the attribute associated with each of the cutting lines L is not limited to the first attribute (the straight line) and the second attribute (the curved line), and another attribute may be associated. For example, a pressure when the cutting blade 72 is pressed against the object to be cut 9, a velocity when relatively moving the cutting blade 72 with respect to the object to be cut 9, and the like may be associated as the attribute with each of the cutting lines L. In this case, the cutting device 1 may decide the surplus cutting length in accordance with the pressure, the velocity, or the like. Further, the cutting device 1 may correct the surplus cutting length in accordance with the material of the object to be cut 9, the type of the holder 6, or the distance W between the first rotation axis U1 and the second rotation axis U2.

The surplus cutting length B(2) may be caused to be equal to or greater than the surplus cutting length C(1). In other words, the surplus cutting lengths B(1) and B(2) decided when the attribute of the cutting line L is the first attribute may be equal to or greater than the surplus cutting lengths C(1) to C(6) decided when the attribute of the cutting line L is the second attribute (B(1)≥B(2)≥C(1) to C(6)). The surplus cutting length B(2) may be zero. The surplus cutting lengths C(1) to C(6) may be zero.

The first threshold value Th1 and the second threshold value Th2 may be the same value as each other or may be differing values. The cutting device 1 may decide the same surplus cutting length, regardless of the angle θ between the first cutting line and the second cutting line. The surplus cutting length B(2) may be a larger value than the surplus cutting length B(1). The surplus cutting lengths C(2) to C(6) may be larger values than the surplus cutting length C(1).

The third threshold value Th3 and the fourth threshold value Th4 may be the same value as each other or may be differing values. The cutting device 1 may decide on the surplus cutting lengths C(5), C(6) when the respective curvatures of three or more of the consecutive cutting lines L are all equal to or greater than the third threshold value Th3. The cutting device 1 may decide on the surplus cutting lengths C(3), C(4) when at least one of the respective curvatures of three or more of the consecutive cutting lines L is smaller than the third threshold value Th3.

The fifth threshold value Th5 that is a determination reference of the length when the respective curvatures of the first cutting line and the second cutting line are equal to or greater than the fourth threshold value Th4, and the fifth threshold value Th5 that is the determination reference of the length when at least one of the curvature of the first cutting line or at least one of the curvature of the second cutting line is smaller than the fourth threshold value Th4 may be differing values.

The cutting device 1 may correct the cutting line L using a different parameter from the surplus cutting length. For example, the cutting device 1 may correct the velocity when the cutting blade 72 relatively moves with respect to the object to be cut 9 and the pressure when the cutting blade 72 is pressed against the object to be cut 9, in accordance with the attribute of the cutting line L, with the angle between the first cutting line and second cutting line, with the curvature, and with the length.

The shape of the cutting blade 72 of the holder 6 is not limited to being circular, and may have a plate shape with a pointed tip. In this case, it is sufficient that the pointed tip end of the cutting blade 72 intersect the second rotation axis U2.

Of the main processing, each of the processing steps other than the processing at step S25 may be performed by a known computer. In this case, the corrected cutting data Da generated as a result of the computer performing the main processing may be output to the cutting device 1. The cutting device 1 may stores the corrected cutting data Da output by the computer in the storage 54. The cutting device 1 may control the conveyance mechanism 2C and the movement mechanism 2D and cut the object to be cut 9 on the basis of the corrected cutting data Da stored in the storage 54.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A cutting device comprising:

a mounter that mounts a cutter thereto;

a movement mechanism that moves the mounter relative to a placement member configured to place an object to be cut;

a storage that stores cutting data for cutting, along a cutting line, the object to be cut placed on the placement member;

a processor that controls the movement mechanism based on the cutting data stored in the storage; and a memory storing computer-readable instructions that, when executed by the processor, instruct the processor to perform processes comprising:

acquisition processing of acquiring an attribute of the cutting line;

decision processing of deciding, based on the attribute acquired by the acquisition processing, a correction amount to correct the cutting line;

generation processing of generating, based on the cutting data stored in the storage, corrected cutting data for cutting the object to be cut along the cutting line corrected by the correction amount decided by the decision processing; and cutting processing of controlling the movement mechanism based on the corrected cutting data generated by the generation processing, and cutting the object to be cut.

2. The cutting device according to claim 1, wherein the attribute includes a first attribute indicating that the cutting line is a straight line, and a second attribute indicating that the cutting line is a curved line, and the decision processing includes causing the correction amount decided when the first attribute is acquired by the acquisition processing to be equal to or greater than the correction amount decided when the second attribute is acquired by the acquisition processing.

3. The cutting device according to claim 1, wherein the storage stores the cutting data for cutting the object to be cut along a first cutting line and a second cutting line that are two of the consecutive cutting lines, and the decision processing includes deciding the correction amount to correct the first cutting line, and causing the correction amount decided when an angle between the first cutting line and the second cutting line is less than a predetermined angle threshold value to be larger than the correction amount decided when the angle is equal to or greater than the angle threshold value.

4. The cutting device according to claim 1, wherein the attribute includes a first attribute indicating that the cutting line is a straight line, and a second attribute indicating that the cutting line is a curved line, and the decision processing includes when the second attribute is acquired by the acquisition processing, causing the correction amount decided when a curvature set for the cutting line is equal to or greater than a predetermined first curvature threshold value to be equal to or less than the correction amount decided when the curvature is smaller than the first curvature threshold value.

5. The cutting device according to claim 4, wherein the storage stores the cutting data for cutting the object to be cut along a first cutting line and a second cutting line that are two of the consecutive cutting lines, and the decision processing includes deciding the correction amount to correct the first cutting line, and when the curvature set for the first cutting line is equal to or greater than the first curvature threshold value, causing the correction amount decided when the respective curvatures of the first cutting line and the second cutting line are equal to or greater than a predetermined second curvature threshold value to be equal to or less than the correction amount decided when at least one of the curvature of the first cutting line or at least one of the curvature of the second cutting line is smaller than the second curvature threshold value.

6. The cutting device according to claim 5, wherein the decision processing includes when the respective curvatures of the first cutting line and the second cutting line are equal to or greater than the second curvature threshold value, causing the correction amount decided when a length of the first cutting line is equal to or greater than a predetermined length threshold value to be equal to or greater than the correction amount decided when the length of the first cutting line is smaller than the length threshold value, and when at least one of the curvatures of the first cutting line and the second cutting line is smaller than the second curvature threshold value, causing the correction amount decided when the length of the first cutting line is equal to or greater than the length threshold value to be equal to or greater than the correction amount decided when the length of the first cutting line is smaller than the length threshold value.

7. The cutting device according to claim 1, wherein the storage stores the cutting data for cutting the object to be cut by relatively moving the cutter from a start point that is an end point at one side on the cutting line, to an end point that is an endpoint at the other side on the cutting line, the correction amount indicates a surplus cutting length, the surplus cutting length being a length between the end point and a corrected point separated, from the end point, to the opposite side from the side of the start point, and the generation processing includes correcting the cutting line based on the surplus cutting length decided by the decision processing, and generating the corrected cutting data for cutting the object to be cut along the corrected cutting line.

8. The cutting device according to claim 1, wherein the cutter includes a circular cutting blade, and a support portion configured to support the circular cutting blade to rotate around a first rotation axis, and configured to rotate around a second rotation axis with respect to the mounter, the first rotation axis not intersecting the second rotation axis, wherein the processor performs the acquisition processing, the decision processing, the generation processing, and the cutting processing, when a setting to cut the object to be cut using the cutter has been received.

* * * * *